(12) United States Patent
Okada et al.

(10) Patent No.: US 11,157,757 B2
(45) Date of Patent: *Oct. 26, 2021

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,503

(22) Filed: Sep. 18, 2019

(65) Prior Publication Data

US 2020/0193189 A1 Jun. 18, 2020

(30) Foreign Application Priority Data

Dec. 14, 2018 (JP) .............................. JP2018-234800

(51) Int. Cl.
*G06K 9/00* (2006.01)
*G06K 9/46* (2006.01)

(52) U.S. Cl.
CPC ..... *G06K 9/00812* (2013.01); *G06K 9/00201* (2013.01); *G06K 9/4604* (2013.01)

(58) Field of Classification Search
CPC ........... G06K 9/00812; G06K 9/00201; G06K 9/4604; G06K 9/4609
See application file for complete search history.

(56) References Cited

U.S. PATENT DOCUMENTS 9,361,529 B2  6/2016  Ryu et al.
9,536,155 B2  1/2017  Takemae
(Continued)

FOREIGN PATENT DOCUMENTS

CN  203318408 U  12/2013
CN  102834309 B  12/2016
(Continued)

OTHER PUBLICATIONS

Automatic Parking Space Detection and Tracking for Underground and Indoor Environments (Year: 2016).*
(Continued)

*Primary Examiner* — Nizar N Sivji
(74) *Attorney, Agent, or Firm* — Oliff PLC

(57) ABSTRACT

An image processing device includes: an extraction unit which extracts a horizontal edge line in which edge points are arranged consecutively in a horizontal direction from an image taken that contains an image of a parking frame; a detection unit which detects a three-dimensional indication body to serve as a stop position indication body in the parking frame based on the horizontal edge line extracted by the extraction unit; and a determining unit which, in a case where a plurality of the horizontal edge lines are arranged in a vertical direction in an image of the three-dimensional indication body detected by the detection unit, determines the stop position regarding one of the plurality of the horizontal edge lines other than a highest horizontal edge line in the vertical direction as corresponding to a top end line of the three-dimensional indication body.

9 Claims, 8 Drawing Sheets

(56) References Cited

U.S. PATENT DOCUMENTS

| | | | |
|---|---|---|---|
| 9,721,460 B2 | 8/2017 | Takemura et al. | |
| 10,311,731 B1 | 6/2019 | Li et al. | |
| 10,373,226 B1 | 8/2019 | Russell et al. | |
| 2002/0087253 A1 | 7/2002 | Jeon | |
| 2003/0128106 A1 | 7/2003 | Ross | |
| 2003/0222983 A1 | 12/2003 | Nobori et al. | |
| 2004/0254720 A1 | 12/2004 | Tanaka et al. | |
| 2006/0080035 A1 | 4/2006 | Daubert et al. | |
| 2008/0109120 A1 | 5/2008 | Sawamoto | |
| 2009/0243889 A1* | 10/2009 | Suhr | G06K 9/00812 340/932.2 |
| 2009/0278709 A1 | 11/2009 | Endo et al. | |
| 2010/0049402 A1 | 2/2010 | Tanaka | |
| 2010/0195901 A1 | 8/2010 | Andrus et al. | |
| 2010/0318467 A1 | 12/2010 | Porter et al. | |
| 2011/0006917 A1 | 1/2011 | Taniguchi et al. | |
| 2013/0027557 A1 | 1/2013 | Hirai et al. | |
| 2013/0266188 A1 | 10/2013 | Bulan et al. | |
| 2014/0355822 A1 | 12/2014 | Choi et al. | |
| 2015/0254981 A1 | 9/2015 | Tachibana et al. | |
| 2015/0294163 A1 | 10/2015 | Sakamoto | |
| 2015/0317526 A1 | 11/2015 | Muramatsu et al. | |
| 2015/0344028 A1 | 12/2015 | Gieseke et al. | |
| 2016/0039409 A1 | 2/2016 | Hayakawa et al. | |
| 2016/0093214 A1 | 3/2016 | Wu et al. | |
| 2016/0107689 A1 | 4/2016 | Lee | |
| 2016/0272244 A1 | 9/2016 | Imai et al. | |
| 2016/0304088 A1 | 10/2016 | Barth | |
| 2017/0085790 A1 | 3/2017 | Bohn | |
| 2018/0012082 A1 | 1/2018 | Satazoda et al. | |
| 2018/0095474 A1* | 4/2018 | Batur | G01S 19/48 |
| 2018/0099661 A1* | 4/2018 | Bae | B62D 15/0285 |
| 2018/0162446 A1 | 6/2018 | Mikuriya et al. | |
| 2018/0215413 A1 | 8/2018 | Inagaki | |
| 2018/0307919 A1 | 10/2018 | Hayakawa | |
| 2018/0307922 A1* | 10/2018 | Yoon | G06T 7/13 |
| 2018/0345955 A1 | 12/2018 | Kim et al. | |
| 2019/0073902 A1* | 3/2019 | Indoh | G06K 9/00812 |
| 2019/0075255 A1 | 3/2019 | Matsumoto et al. | |
| 2019/0094871 A1* | 3/2019 | Sugano | G05D 1/0214 |
| 2019/0370572 A1 | 12/2019 | Nagpal et al. | |
| 2020/0062242 A1 | 2/2020 | Hayakawa | |
| 2020/0074192 A1 | 3/2020 | Ogata et al. | |
| 2020/0104613 A1 | 4/2020 | Hirai | |
| 2020/0117927 A1 | 4/2020 | Oba | |
| 2020/0118310 A1 | 4/2020 | Matsumoto et al. | |
| 2020/0175634 A1 | 6/2020 | Aggarwala et al. | |
| 2020/0193643 A1* | 6/2020 | Hess | G06K 9/00818 |
| 2020/0398827 A1 | 12/2020 | Hara | |
| 2021/0180954 A1 | 6/2021 | Hiyokawa et al. | |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 1020170102192 A | 9/2017 |
| WO | 03058163 A1 | 7/2003 |
| WO | 2005081941 A2 | 9/2005 |
| WO | 2010116922 A1 | 10/2010 |
| WO | 2014/084118 A1 | 6/2014 |
| WO | 2017/068699 A1 | 4/2017 |

OTHER PUBLICATIONS

Surround View based Parking Lot Detection and Tracking (Year: 2015).*
A Universal Vacant Parking Slot Recognition System Using Sensors Mounted on Off-the-Shelf Vehicles (Year: 2018).*
U.S. Appl. No. 16/574,395, filed Sep. 18, 2019 in the name of Yasutaka Okada et al.
U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Jun. 30, 2020 Notice of Allowance issued in U.S. Appl. No. 16/574,546.
Aug. 3, 2020 Office Action issued in U.S. Appl. No. 16/574,598.
Sep. 29, 2020 Office Action issued in U.S. Appl. No. 16/574,391.
Sep. 2, 2020 Corrected Notice of Allowability issued in U.S. Appl. No. 16/574,546.
Nov. 12, 2020 Notice of Allowance issued in U.S. Appl. No. 16/574,598.
Dec. 3, 2020 Office Action issued in U.S. Appl. No. 16/574,393.
Reinhard et al., Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.
Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Mar. 19, 2021 Office Action issued in U.S. Appl. No. 16/574,462.
Mar. 25, 2021 Office Action issued in U.S. Appl. No. 16/574,391.
Apr. 9, 2021 Office Action issued in U.S. Appl. No. 16/574,393.
Mar. 30, 2021 Office Action issued in U.S. Appl. No. 16/574,516.
Apr. 6, 2021 Office Action issued in U.S. Appl. No. 16/574,507.
May 19, 2021 Office Action issued in U.S. Appl. No. 16/574,395.
May 12, 2021 Notice of Allowance issued in U.S. Appl. No. 16/574,422.
Jul. 20, 2021 Notice of Allowance issued in U.S. Appl. No. 16/574,507.

* cited by examiner

SPRAG IS DETECTED

STOP POSITION IS DETERMINED WITH THIS HORIZONTAL EDGE LINE AS CORRESPONDING TO TOP END LINE OF SPRAG

| | THREE-DIMENSIONAL INDICATION BODY | |
|---|---|---|
| | SPRAG | CURB |
| LENGTH | LONGER THAN OR EQUAL TO 40 cm AND SHORTER THAN 150 cm | LONGER THAN OR EQUAL TO 150 cm |

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234800 filed on Dec. 14, 2018.

TECHNICAL FIELD

The present invention relates to an image processing device and an image processing method.

BACKGROUND ART

In recent years, with the development of autonomous drive techniques, image processing devices for detecting a parking frame in which to park a vehicle on the basis of an image taken by shooting a neighborhood of the vehicle have been coming into wide use. Image processing devices of this type detect partition lines of a parking frame on the basis of an image taken and detect the parking frame on the basis of the detected partition lines (refer to JP-A-2017-87758, for example).

Furthermore, image processing devices detect, for example, a three-dimensional indication body such as a curb or a sprag(s) and determine a stop position in the parking frame on the basis of the detected three-dimensional indication body.

SUMMARY OF INVENTION

However, the conventional techniques have room for improvement in how to determine a proper stop position. More specifically, if, for example, fallen leaves or the like are laid along the bottom end line of a curb or a sprag, trouble may occur that the bottom end line of such a three-dimensional indication body cannot be detected to cause an error in measuring a distance to the three-dimensional indication body.

The present invention has been made in view of the above, and an object of the invention is therefore to provide an image processing device and an image processing method capable of determining a proper stop position with high accuracy.

The image processing device according to the embodiment is equipped with an extraction unit, a detection unit, and a determining unit. The extraction unit extracts a horizontal edge line in which edge points are arranged consecutively in the horizontal direction from an image taken that contains an image of a parking frame. The detection unit detects a three-dimensional indication body to serve as a stop position indication body in the parking frame on the basis of the horizontal edge line extracted by the extraction unit. The determining unit determines a stop position regarding a certain horizontal edge line other than a highest horizontal edge line in the vertical direction as corresponding to a top end line of the three-dimensional indication body if plural horizontal edge lines are arranged in the vertical direction in an image of the three-dimensional indication body detected by the detection unit.

The invention makes it possible to determine a proper stop position.

DETAILED DESCRIPTION OF THE INVENTION

An image processing device 1 and an image processing method according to an embodiment will be hereinafter described in detail with reference to the accompanying drawings. The present invention is not limited by the embodiment.

Figure 1A:
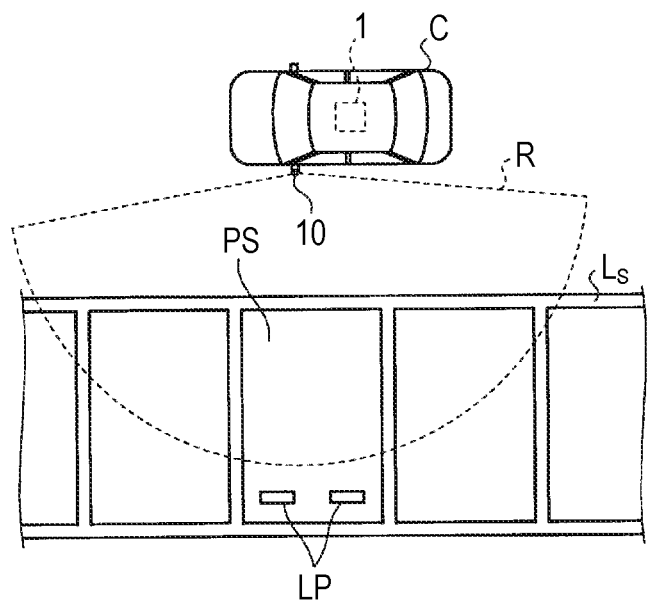
FIG. 1A is a first drawing that outlines an image processing method according to an embodiment.
Figure 1B:
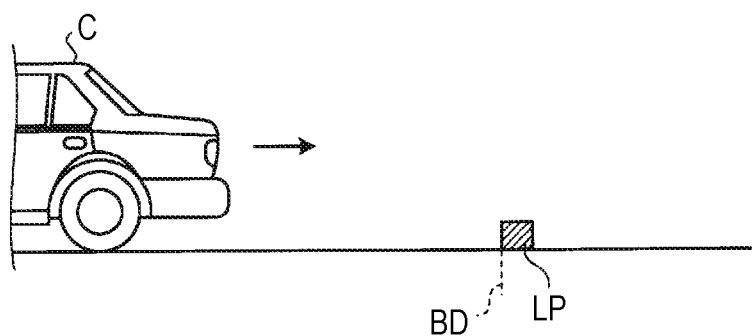
FIG. 1B is a second drawing that outlines the image processing method according to the embodiment.
Figure 1C:
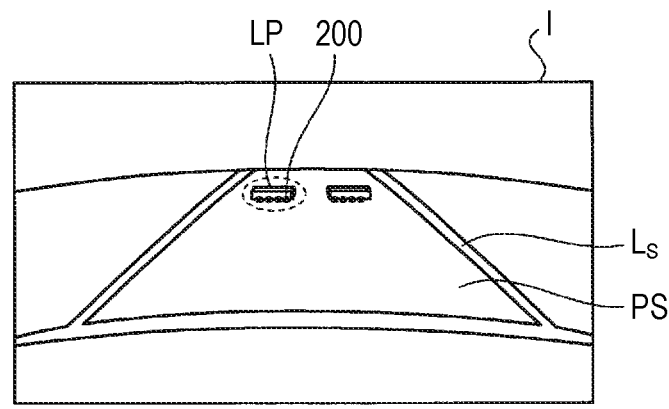
FIG. 1C is a third drawing that outlines the image processing method according to the embodiment.
Figure 1C:
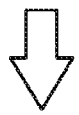
Figure 1C:
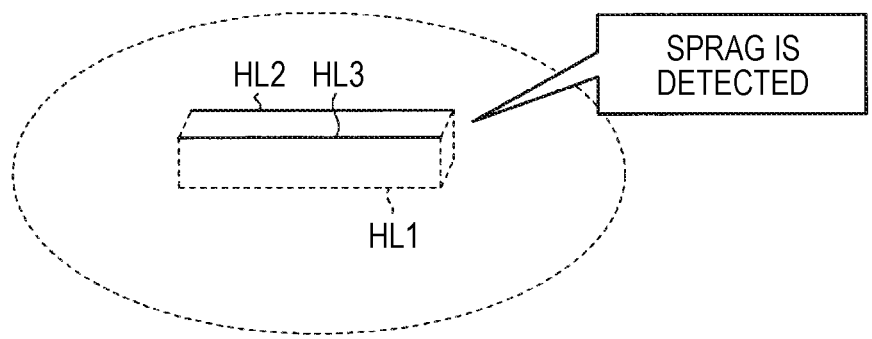
Figure 1C:
Figure 1C:
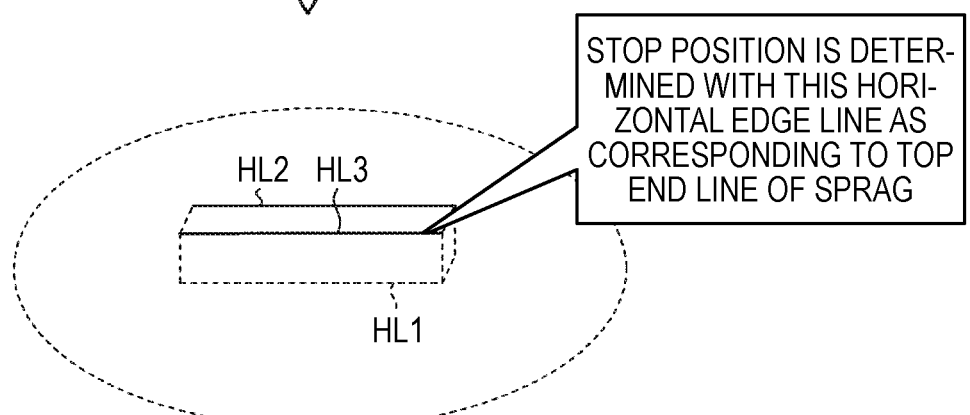

First, the image processing method according to the embodiment will be outlined with reference to FIGS. 1A-1C. FIGS. 1A-1C outline the image processing method according to the embodiment. How the image processing device 1 according to the embodiment determines a stop position in a parking frame by performing the image processing method according to the embodiment will be described with reference to FIGS. 1A-1C.

As shown in FIG. 1A, the image processing device 1 is incorporated in a vehicle C and performs the image processing method according to the embodiment. More specifically, first, the image processing device 1 detects a parking frame PS on the basis of an image taken by a vehicular camera 10. Each parking frame PS is a region in which to park a vehicle and that is formed by partition lines Ls. In the example shown in FIG. 1, each parking frame PS is surrounded from the four sides by two partition lines Ls that extend alongside the side surfaces of the vehicle C and serve for partitioning in the vehicle width direction (in the case where the vehicle C is parked) and partition lines Ls that extend in the vehicle width direction and serve for partitioning in the vehicle longitudinal direction. Alternatively, the parking frame PS may be such as not to have partition lines Ls extending in the vehicle width direction and to be defined by only two partition lines Ls extending in the vehicle longitudinal direction. As a further alternative, the parking frame PS may be a U-shaped one that does not have a front-side partition line Ls extending in the vehicle width direction and has a deep-side partition line Ls extending in the vehicle width direction and two partition lines Ls extending in the vehicle longitudinal direction.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

As shown in FIG. 1A, each parking frame PS is provided with three-dimensional indication bodies which are white lines or three-dimensional bodies (in the following, the term "three-dimensional indication body" includes a white line) and indicate a stop position. The three-dimensional indication body is not limited to a sprag LP and may be, for example, a curb or a partition line Ls that is a white line. The image processing device 1 detects such three-dimensional indication bodies and determines a stop position on the basis of the positions of the three-dimensional indication bodies. For example, the three-dimensional indication bodies are detected on the basis of horizontal edge lines in each of which edge points are arranged consecutively in the horizontal direction (vehicle width direction) among edge points obtained from an image taken.

As shown in FIG. 1B, for example, where the three-dimensional indication bodies are sprags LP, the image processing device 1 determines a stop position so that the bottom portion of each rear wheel of the vehicle C will be located just in front of a lower end position BD of a sprag LP.

Incidentally, conventional techniques have room for improvement in how to determine a proper stop position. More specifically, if, for example, obstructive objects such as fallen leaves are laid along the bottom end lines of the sprags LP, trouble may occur that horizontal edge lines corresponding to the bottom end lines of the sprags LP cannot be detected to cause an error in measuring a distance to the sprags LP. For example, if the bottom end lines of the sprags LP cannot be detected, ranging may be performed in such a manner that a horizontal edge line corresponding to a top end line of each sprag LP is regarded as that corresponding to a bottom end line, resulting in trouble that a stop position is determined to be a position that is on the deep side of the true position of the sprag LP.

In view of the above, in the image processing method according to the embodiment, ranging is performed in such a manner that a horizontal edge line is regarded as corresponding to a top end line of each sprag LP rather than a bottom end line. A specific example of the image processing method according to the embodiment will be described below with reference to FIG. 1C.

As shown in the top part of FIG. 1C, first, the image processing device 1 acquires an image I taken that contains images of a parking frame PS and sprags LP. It is assumed that the image I reflects a state that obstructive objects 200 such as fallen leaves are laid along the bottom end lines of the sprags LP.

Then, as shown in the middle part of FIG. 1C, the image processing device 1 performs edge extraction processing on the image I and extracts, from the image I, horizontal edge lines HL2 and HL3 in each of which edge points are arranged consecutively in the horizontal direction. In the middle part of FIG. 1C, it is assumed that a horizontal edge line HL1 that should correspond to the bottom end line of the sprag LP is not extracted because of the presence of the obstructive objects 200.

If each of the plural horizontal edge lines HL2 and HL3 coincides with a prescribed three-dimensional indication body pattern, the image processing device 1 detects the plural horizontal edge lines HL2 and HL3 as corresponding to the sprag LP. A detailed method for detecting a three-dimensional indication body including a sprag LP will be described later.

Then, as shown in the bottom part of FIG. 1C, if the plural horizontal edge lines HL2 and HL3 corresponding to the detected sprag LP are arranged in the vertical direction of the image I, the image processing device 1 presumes a bottom end line regarding, as corresponding to a top end line of the sprag LP, a certain horizontal edge line (e.g., horizontal edge line HL3) other than the horizontal edge line HL2 that is located highest in the vertical direction and determines a stop position on the basis of the presumed bottom end line.

That is, in the image processing method according to the embodiment, ranging is performed assuming that the bottom end line of each sprag LP is not detected and a certain horizontal edge line HL3 excluding the highest horizontal edge line HL2 corresponds to a top end line. With this measure, unlike in conventional techniques, trouble can be avoided that a top end line of each sprag is judged erroneously as a bottom end line, as a result of which a stop position is determined erroneously and the vehicle C goes up onto the sprags LP. As such, the image processing method according to the embodiment can determine a proper stop position.

Although the image processing method according to the embodiment assumes that the bottom end line of each sprag LP is not detected, there may occur a case that a horizontal edge line HL1 corresponding to the bottom end line of each sprag LP is detected. In this case, the image processing device 1 performs ranging regarding the horizontal edge line HL1 as corresponding to a top end line. As a result, a stop position is determined so that the bottom portions of the rear wheels will be located in front of the sprags LP and hence a situation that the vehicle C goes up onto the sprags LP can be avoided with high accuracy.

In the following, where there is no need to discriminate the horizontal edge lines HL1-HL3 from each other, they will be referred to as "horizontal edge lines HL."

Figure 2:
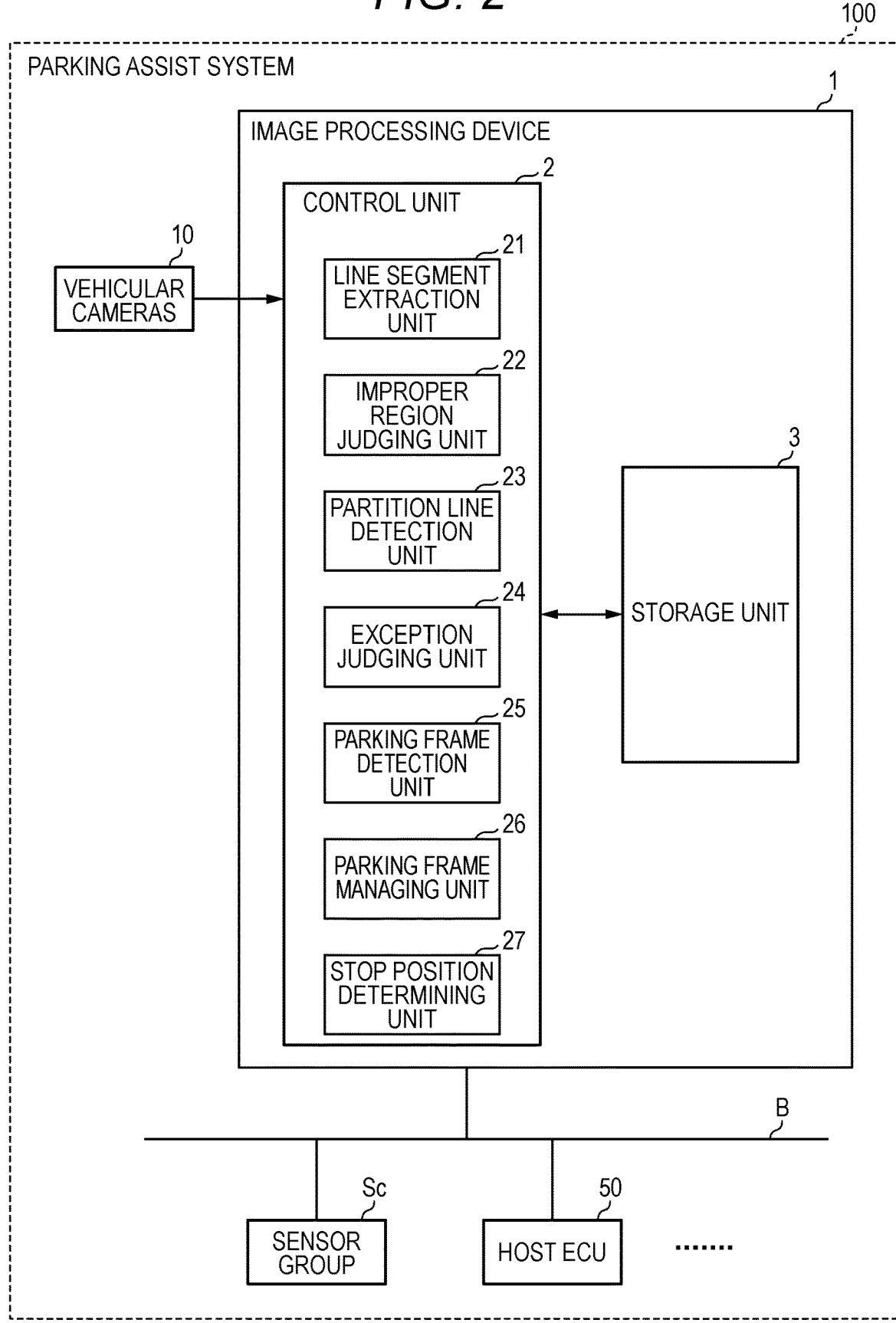
FIG. 2 is a functional block diagram showing an example configuration of an image processing apparatus according to the embodiment.

Next, an example configuration of the image processing device 1 according to the embodiment will be described with reference to FIG. 2. FIG. 2 is a functional block diagram of a parking assist system 100 including the image processing device 1 and shows an example configuration of the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B which complies with the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C in a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with a line segment extraction unit 21, an improper region judging unit 22, a partition line detection unit 23, an exception judging unit 24, a parking frame detection unit 25, a parking frame managing unit 26, and a stop position determining unit 27.

For example, the control unit 2 includes a computer having a CPU (central processing unit), a ROM (read-only memory), a RAM (random access memory), an HDD (hard disk drive), an input/output port, etc., and other various kinds of circuits.

For example, the CPU of the computer functions as the line segment extraction unit 21, the improper region judging unit 22, the partition line detection unit 23, the exception judging unit 24, the parking frame detection unit 25, the parking frame managing unit 26, and the stop position determining unit 27 by reading out programs stored in the ROM and running them.

All or part of the line segment extraction unit 21, the improper region judging unit 22, the partition line detection unit 23, the exception judging unit 24, the parking frame detection unit 25, the parking frame managing unit 26, and the stop position determining unit 27 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame detection process and a stop position determining process (described later) either in the case where the vehicle C is considered to be running in a parking lot (e.g., the vehicle speed is lower than or equal to 30 km/h) or during all the period when the vehicle C is running.

The line segment extraction unit 21 extracts edge points on the basis of the luminance of each of pixels of an image data that is taken and input from a vehicular camera 10. More specifically, the line segment extraction unit 21 converts image data received from the vehicular camera 10 into a grayscale image. Grayscaling is processing of converting the value of each pixel of image data into one of prescribed gradation levels of white to black (e.g., 256 gradation levels) according to its luminance.

Then the line segment extraction unit 21 calculates edge intensity and a luminance gradient of each pixel by, for example, applying a Sobel filter to the grayscale image. The line segment extraction unit 21 thereafter extracts edge points by extracting pixels whose edge intensity values exceed a prescribed value. The line segment extraction unit 21 communicates edge information relating to the extracted edge points to the improper region judging unit 22.

The improper region judging unit 22 judges, on the basis of the edge points extracted by the line segment extraction unit 21, presence/absence of an improper region where detection of a partition line to constitute a parking frame PS is difficult. For example, the improper region judging unit 22 determines, as an improper region, an unpaved road surface region (e.g., graveled region) and a grating region where more edge points are detected than in a paved road surface.

More specifically, the improper region judging unit 22 can judge, as an improper region, a region where the density of edge points is higher than a prescribed value or the luminance gradient of edge points is not uniform. The improper region judging unit 22 eliminates edge information of the improper region from the above-mentioned edge information on the basis of the thus-determined improper region and gives resulting information to the downstream stage.

The partition line detection unit 23 detects partition line candidates, that is, candidates for partition lines to partition a parking frame PS, on the basis of the edge points extracted by the line segment extraction unit 21. More specifically, the partition line detection unit 23 detects, as a partition line candidate, two edge lines each of which is a connection of plural consecutive edge points if they are approximately parallel with each other and whose interval corresponds to the width of partition lines.

That is, the partition line detection unit 23 detects, as a partition line candidate, two edge lines to correspond to two respective end lines of each partition line. The partition line detection unit 23 generates partition line information relating to the detected partition line candidates and communicates the generated partition line information to the exception judging unit 24.

The partition line detection unit 23 can perform the processing of detecting partition line candidates in such a manner as to eliminate the improper region detected by the improper region judging unit 22. In other words, the partition line detection unit 23 does not perform the partition line candidate detection processing for the improper region. This makes it possible to reduce the processing load of the control unit 2.

The exception judging unit 24 judges presence/absence of a parking prohibition region where parking of the vehicle C is not permitted, on the basis of the partition line candidates detected by the partition line detection unit 23. For example, the exception judging unit 24 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 24 can judge presence/absence of a partition line candidate(s) that is not necessary for detection of a parking frame PS, such as (part of) a road surface marking. For example, the exception judging unit 24 can detect a road surface marking contained in image data by matching partition line candidates detected by the partition line detection unit 23 with template models of road surface markings.

The exception judging unit 24 eliminates unnecessary partition line candidates from the partition line information, adds information indicating the parking prohibition region to the partition line information, and communicates the resulting partition line information to the parking frame detection unit 25.

The parking frame detection unit 25 detects a parking frame PS on the basis of the partition line candidates detected by the partition line detection unit 23. More specifically, the parking frame detection unit 25 detects, as part of a parking frame PS, two partition line candidates that are arranged parallel with each other in the horizontal direction (vehicle width direction) with a prescribed interval.

The prescribed interval is a width of a standard parking region for common or public use that is prescribed in, for example, a law relating to parking lots. At this time, the parking frame detection unit 25 detects a parking frame PS so as to exclude the parking prohibition region determined by the exception judging unit 24.

That is, the parking frame detection unit 25 detects a parking frame PS so as to exclude a zebra zone or the like. Upon detecting the parking frame PS, the parking frame detection unit 25 communicates parking frame information relating to the detected parking frame PS to the parking frame managing unit 26. In the following, the partition line candidates detected as constituting a parking frame PS will be referred to as "partition lines." Each piece of partition line information includes apex coordinates of each partition line with reference to the vehicle C.

The parking frame managing unit 26 manages, in time series, the partition frame information of the parking frame PS detected by the parking frame detection unit 25. The parking frame managing unit 26 can estimate a movement distance of the vehicle C on the basis of sensor values received from the sensor group Sc and estimate apex coordinates of current apex coordinates of each partition line on the basis of the movement distance and past partition frame information.

Furthermore, the parking frame managing unit 26 can update the coordinate information of each partition line of past partition frame information on the basis of newly received partition frame information. That is, the parking frame managing unit 26 updates the relative positional relationship between the vehicle C and the parking frame PS at such occasions as the vehicle C moves.

Still further, it is also possible for the parking frame managing unit 26 to set a detection range of a parking frame PS with an assumption that plural parking frames PS are arranged continuously. For example, the parking frame managing unit 26 assumes that plural parking frames PS exist continuously including one parking frame PS (reference parking frame) detected by the parking frame detection unit 25.

And the parking frame managing unit 26 sets the thus-assumed range of the plural parking frames PS as a detection range. With this measure, it suffices for the above-described line segment extraction unit 21 to perform edge line detection processing only for the detection range set by the parking frame managing unit 26, whereby the processing load of the control unit 2 can be reduced.

The stop position determining unit 27 determines a stop position of the vehicle C, that is, a parking position in the parking frame, on the basis of the edge points extracted by the line segment extraction unit 21. For example, the stop position determining unit 27 determines a stop position of the vehicle C by detecting a three-dimensional indication body such as a sprag(s) LP or a curb on the basis of the edge points extracted by the line segment extraction unit 21.

Figures 3, 4:
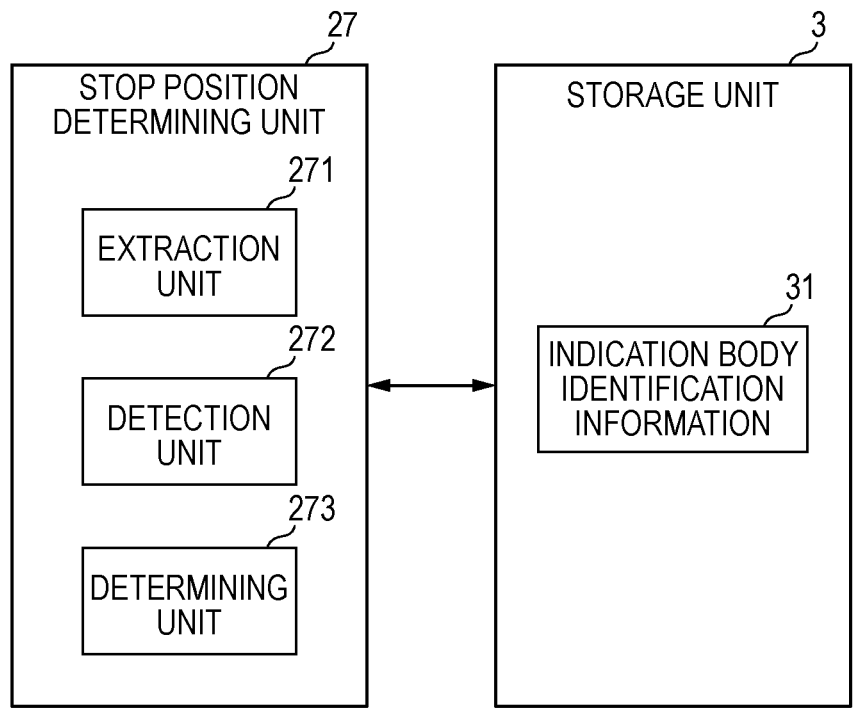
FIG. 3 is a functional block diagram showing an example configuration of a stop position determining unit.
FIG. 4 shows an example of indication body identification information.

Next, how the stop position determining unit 27 operates will be described in detail with reference to FIGS. 3-7. FIG. 3 is a functional block diagram showing the configuration of the stop position determining unit 27.

As shown in FIG. 3, the stop position determining unit 27 is equipped with an extraction unit 271, a detection unit 272, and a determining unit 273. The stop position determining unit 27 performs various kinds of processing using indication body identification information 31 stored in the storage unit 3.

First, the indication body identification information 31 will be described with reference to FIG. 4. FIG. 4 shows an example of the indication body identification information 31. As shown in FIG. 4, the indication body identification information 31 includes information relating to a length of each type of three-dimensional indication body. The term "length" means an actual length of a three-dimensional indication body in the horizontal direction that is represented by the length of a horizontal edge line HL obtained from an image I taken. For example, the indication body identification information 31 is used when the detection unit 272 (described later) judges a type of three-dimensional indication body.

In the example shown in FIG. 4, the actual length of a sprag LP is longer than or equal to 40 cm and shorter than 150 cm and the actual length of a curb is longer than or equal to 150 cm. Thus, the detection unit 272 (described later) judges a type of a three-dimensional indication body using 150 cm as a prescribed threshold value. The prescribed threshold value is not restricted to 150 cm and may be any length that enables discrimination between the sprag LP and the curb.

Although in FIG. 4 the sprag LP and the curb are listed as example types of three-dimensional indication body, other types of three-dimensional indication body may be employed as long as they can serve as an indication body indicating a stop position. For example, the sprag LP is an example three-dimensional indication body to be set inside a parking frame PS; another example is the lock plate that is used in coin parking lots. The curb is an example three-dimensional indication body that constitutes a deep-side boundary of a parking frame PS; other examples are the white line and the wall.

Although the indication body identification information 31 shown in FIG. 4 is such that an actual length of a three-dimensional indication body is stored so as to indicate a prescribed threshold value, the indication body identification information 31 may be stored as information indicating, for example, a prescribed threshold value of an edge length (e.g., the number of pixels) of a horizontal edge line HL.

Returning to FIG. 3, the extraction unit 271 will be described below. The extraction unit 271 extracts a horizontal edge line HL in which edge points are arranged consecutively in the horizontal direction from an image I taken that contains an image of a parking frame PS. The extraction unit 271 extracts an edge line by connecting adjoining pixels in the case where pixels as edge points adjoin each other. In this case, the length of an edge line (i.e., edge length) can be expressed as the number of pixels.

Instead of extracting an edge line by connecting adjoining edge points (pixels), for example, the extraction unit 271 may form a horizontal edge line HL by connecting non-edge-point pixels on both sides of which edge points exist.

More specifically, when edge points are located on the two respective sides of non-edge-point pixels the number of which is smaller than a prescribed number, the extraction unit 271 extracts a horizontal edge line HL by connecting the non-edge-point pixels and the edge points located on both sides of them. With this measure, for example, non-edge-point pixels that were produced due to noise or the like from pixels that should have been extracted as edge points can be extracted as part of an edge line. That is, the influence of noise can be canceled out.

The shape of an extracted horizontal edge line HL varies depending on whether edge points are in an after-projection state or a before-projection state. For example, where edge points are in a state that they have been projected onto a road surface coordinate plane, the extraction unit 271 extracts a horizontal edge line HL that extends straightly in the horizontal direction. Where edge points are in a state that they have not been projected, that is, they remain in the same state as were extracted from an image I taken, the extraction unit 271 extracts a horizontal edge line HL having a shape that depends on the lens characteristic of the vehicular camera 10 used. More specifically, where the lens system of the vehicular camera 10 employs a fisheye lens, the extraction unit 271 extracts a horizontal edge line HL that is curved so as to be convex or concave in the vertical direction in the image I. The extraction unit 271 outputs the extracted horizontal edge line HL to the detection unit 272.

The detection unit 272 detects a three-dimensional indication body to be used as an indication body indicating a stop position in the parking frame PS on the basis of the horizontal edge line HL extracted by the extraction unit 271. For example, the detection unit 272 detects a three-dimensional indication body if the length, number, and arrangement of the extracted horizontal edge line(s) HL coincide with those of any of prescribed three-dimensional indication body patterns.

More specifically, first, the detection unit 272 sets, as a three-dimensional indication body search region, a deep-side region of the parking frame PS detected by the parking frame detection unit 25. More specifically, the detection unit 272 sets, as a search region, a deep-side end region of the parking frame PS. This is because a three-dimensional indication body such as a sprag LP or a curb is disposed on the deep side in the parking frame PS.

This makes it possible to reduce the processing load of the control unit 2. Alternatively, the detection unit 272 may set the entire image I as a search region, in which case a failure of detecting a three-dimensional indication body can be avoided.

The detection unit 272 judges whether each horizontal edge line HL existing in the search region corresponds to a three-dimensional indication body. For example, the detection unit 272 judges a type of a three-dimensional indication body on the basis of an edge length of each horizontal edge line HL. More specifically, the detection unit 272 judges a type of a three-dimensional indication body on the basis of the lengths of the three-dimensional indication bodies that are part of the indication body identification information 31 stored in the storage unit 3.

More specifically, if an actual length that is determined on the basis of the edge length of a horizontal edge line HL is longer than or equal to a prescribed threshold value (in the example of FIG. 4, 150 cm), the detection unit 272 detects a three-dimensional indication body whose type is the curb (or white line, wall, or the like). If an actual length that is determined on the basis of the edge length of a horizontal edge line HL is shorter than the prescribed threshold value, the detection unit 272 detects a three-dimensional indication body whose type is the sprag LP.

Detecting a three-dimensional indication body on the basis of the edge length of a horizontal edge line HL in the above-described manner makes it possible to judge whether the type of a detected three-dimensional indication body is the sprag LP or the curb with high accuracy. In other words, doing so makes it possible to judge, with high accuracy, whether a detected three-dimensional indication body is located inside the parking frame PS or constitutes a deep-side boundary of the parking frame PS. As a result, it can be judged correctly whether the determining unit 273 (described later) should set the stop position so that the rear end of the vehicle C will be located just in front of the curb or the bottom portion of a rear wheel of the vehicle C will be located just in front of the sprag LP.

Furthermore, the detection unit 272 judges a type of a three-dimensional indication body on the basis of, for example, the number of horizontal edge lines HL instead of the edge length of a horizontal edge line HL. More specifically, if plural horizontal edge lines HL being such that actual lengths determined on the basis of their edge lengths of are shorter than the prescribed threshold value are arranged side by side in the horizontal direction, the detection unit 272 detects those plural horizontal edge lines HL as corresponding to sprags LP. This makes it possible to increase the accuracy of detection of sprags LP.

Still further, if a single horizontal edge line HL whose actual length determined on the basis of its edge length is longer than or equal to the prescribed threshold value passes the vicinities of the deep-side ends of two partition lines as width-side end lines of the parking frame PS, the detection unit 272 detects this horizontal edge line HL as corresponding to a curb (top end line or bottom end line). For another example, the detection unit 272 detects, as corresponding to a sprag LP, a horizontal edge line HL whose actual length determined on the basis of its edge length is shorter than the prescribed threshold value and that is located on the deep side in the parking frame PS and obliquely in front of the deep-side ends of two partition lines as width-side end lines of the parking frame PS.

The detection unit 272 can detect a three-dimensional indication body even if not all of horizontal edge lines HL corresponding to it is detected. For example, even if a horizontal edge line HL corresponding to the bottom end line of a three-dimensional indication body because of presence of obstructive objects such as fallen leaves, the detection unit 272 detects a three-dimensional indication body as long as a horizontal edge line HL corresponding to its top end line coincides with any of the above-described three-dimensional indication body patterns.

When detecting a three-dimensional indication body, the detection unit 272 communicates indication body information relating to the detected three-dimensional indication body to the determining unit 273. If a horizontal edge line HL does not coincide with any of the above-described three-dimensional indication body patterns, the detection unit 272 judges that the horizontal edge line HL was produced by road surface noise, for example.

If plural horizontal edge lines HL are arranged in the vertical direction in an image of the three-dimensional indication body detected by the detection unit 272, the determining unit 273 determines a stop position regarding, as corresponding to a top end line of the three-dimensional indication body, a certain horizontal edge line HL other than the horizontal edge line HL that is located highest in the vertical direction.

How the determining unit 273 operates will be described below in a specific manner with reference to FIGS. 5 and 6.

Figure 5:
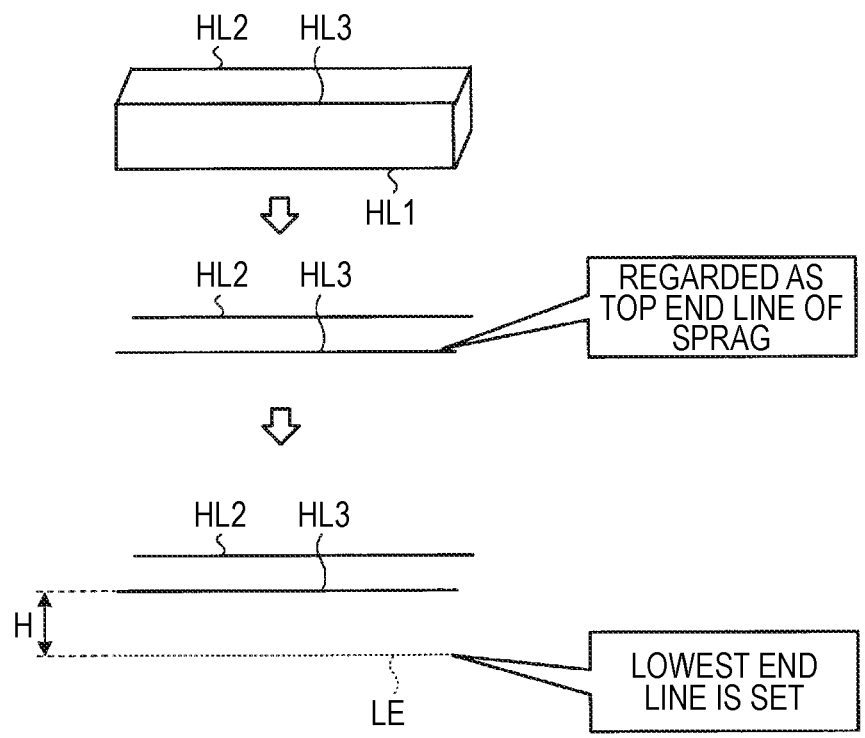
FIG. 5 is a diagram illustrating how a determining unit operates.
Figure 6:
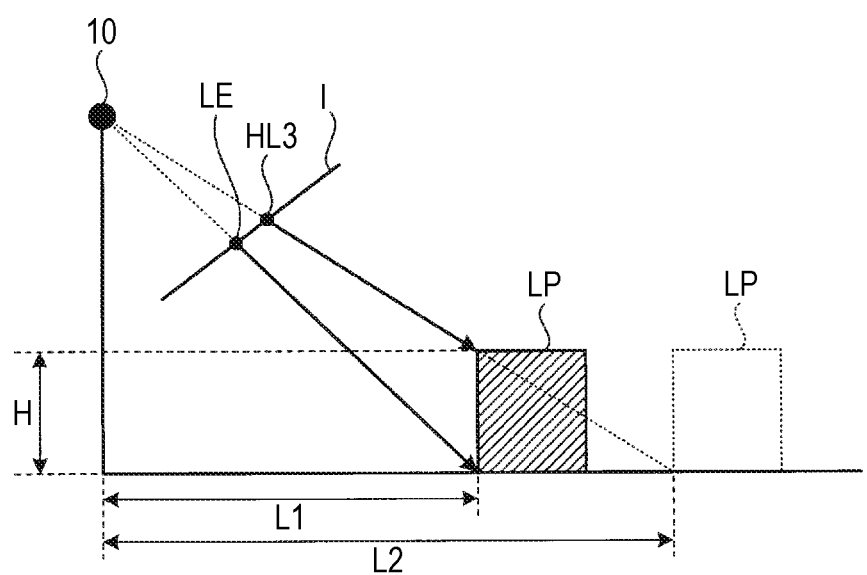
FIG. 6 is another diagram illustrating how the determining unit operates.

FIGS. 5 and 6 are diagrams illustrating how the determining unit 273 operates. In FIG. 5, it is assumed that a block-type (rectangular-prism-shaped) sprag LP has been detected by the detection unit 272 as corresponding to two horizontal edge lines HL2 and HL3. That is, it is assumed that a horizontal edge line HL1 corresponding to the bottom end line of the sprag LP was not extracted by the extraction unit 271.

If ranging were performed in such a manner that the horizontal edge line HL3 that actually corresponds to a top end line is regarded as the bottom end line because of non-detection of the horizontal edge line HL1 that corresponds to the bottom end line (referred to as a referential example below), as shown in FIG. 6 a distance L2 to the sprag LP would be calculated using that erroneously detected bottom end line. That is, ranging would be performed with the erroneous recognition that the sprag LP is located on a position that is deeper than its actual position.

In view of the above, the determining unit 273 performs ranging regarding, of the two horizontal edge lines HL, the horizontal edge line HL3 other than the highest horizontal edge line HL2 as a top end line of the sprag LP (see FIG. 5). The determining unit 273 presumes a lowest end line LE below the horizontal edge line HL3 that is regarded as corresponding to the top end line.

More specifically, the determining unit 273 sets the lowest end line LE at a position that is located below the horizontal edge line HL3 by a prescribed height H. For example, the average of heights of sprags LP on the market can be employed as the prescribed height H. That is, on the premise that the bottom end line of the three-dimensional indication body is not detected, the determining unit 273 performs ranging assuming that the three-dimensional indication body has the height H.

As shown in FIG. 6, the determining unit 273 calculates a distance L1 to the lowest end line LE by projecting the lowest end line LE in the image I taken onto the road surface coordinate plane on the basis of an installation height and angle of the vehicular camera 10. Where the type of three-dimensional indication body is the sprag LP, the determining unit 273 calculates a distance L1 using the bottom portion of the rear wheel as a reference. Where the type of three-dimensional indication body is the curb, the determining unit 273 calculates a distance L1 using the rear end of the vehicle C as a reference.

As a result, an event can be prevented that as in the referential example the distance to the sprag LP is miscalculated to be L2 (i.e., the sprag LP is judged as if to be located on the deeper side of its actual position) because ranging is performed regarding the horizontal edge line HL3 as corresponding to the bottom end line of the three-dimensional indication body.

Whereas the case shown in FIGS. 5 and 6 is such that the horizontal edge line HL1 corresponding to the bottom end line of the sprag LP is not extracted, there may occur another case that the horizontal edge line HL1 is extracted but the horizontal edge line HL2 (deep side) or the horizontal edge line HL3 (front side) which correspond to the respective top end lines of the sprag LP are not extracted.

Even in the above case, the determining unit 273 performs ranging regarding the horizontal edge line HL1 as corresponding to a top end line. In this case, the determining unit 273 calculates the distance to the sprag LP to be shorter (i.e., the sprag LP is judged as if to be located closer to the front end of the parking frame) than in the case where the horizontal edge line HL3 is regarded as corresponding to a top end line. In this case, since a stop position is set on the front side of the sprag LP, an event that the rear wheel goes up onto the sprag LP can be prevented with high accuracy.

Figure 7:
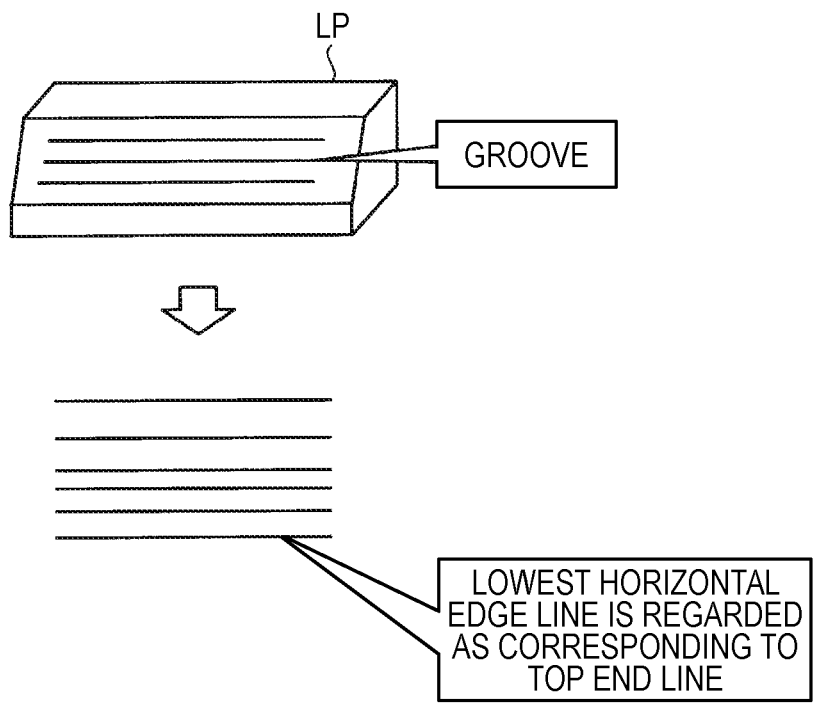
FIG. 7 shows another example operation of the determining unit.

Next, how the determining unit 273 operates when another type of sprag LP is used will be described with reference to FIG. 7. FIG. 7 shows another example determining operation of the determining unit 273. FIG. 7 shows a sprag LP that is formed with grooves that extend in the horizontal direction.

When this sprag LP is detected by the detection unit 272, plural horizontal edge lines HL are extracted that include ones corresponding to the respective grooves.

When plural horizontal edge lines HL are arranged in the vertical direction of the image I taken, the determining unit 273 determines a stop position regarding the lowest horizontal edge line HL as corresponding to a top end line. More specifically, the determining unit 273 determines a stop position regarding the lowest horizontal edge line HL among the plural horizontal edge lines HL as corresponding to a top end line.

With this measure, since a stop position is set in front of the sprag LP, an event that the rear wheel goes up onto the sprag LP can be prevented reliably. Although in the example of FIG. 7 the lowest one of the plural horizontal edge lines HL arranged in the vertical direction is regarded as corresponding to a top end line, any horizontal edge line HL other than the highest one may be regarded as corresponding to a top end line.

Figure 8:
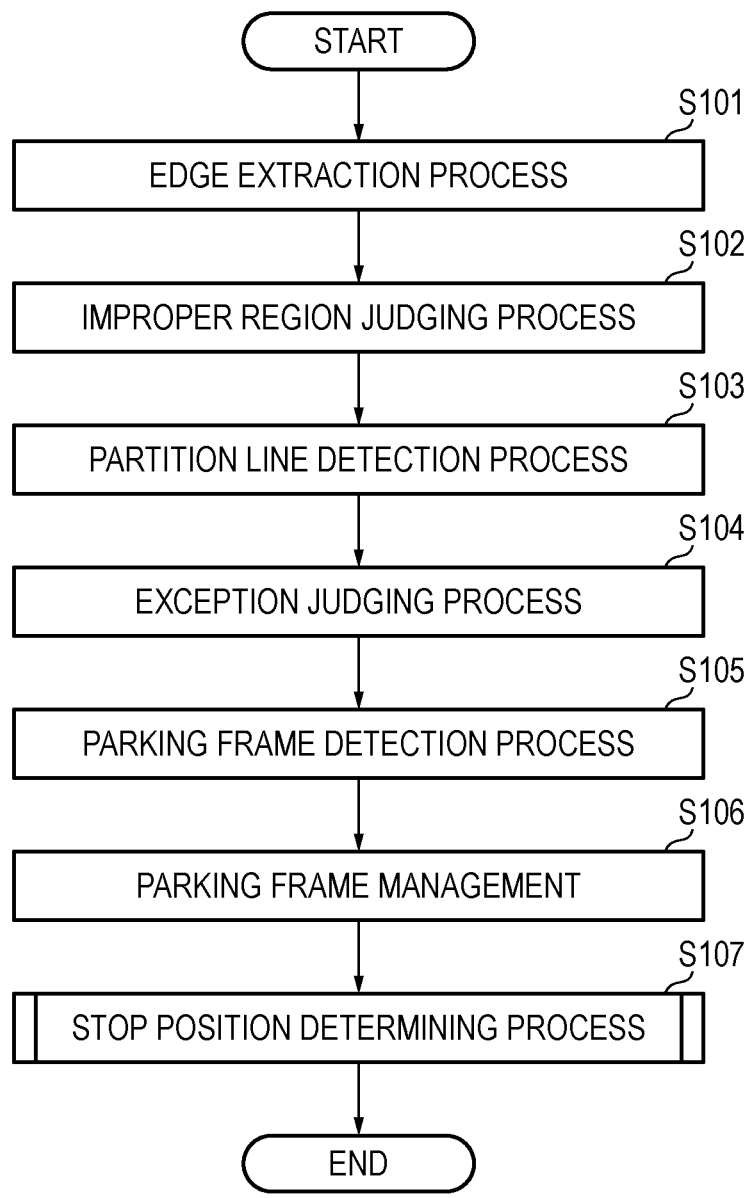
FIG. 8 is a flowchart showing the procedure of the overall process that is executed by the image processing device according to the embodiment.

Next, the procedure of a process that is executed by the image processing device 1 according to the embodiment will be described with reference to FIG. 8. FIG. 8 is a flowchart showing the procedure of the overall process that is executed by the image processing device 1. For example, this overall process is executed by the control unit 2 repeatedly while the vehicle speed of the vehicle C is lower than or equal to a prescribed value (e.g., 30 km/h).

As shown in FIG. 8, first, at step S101, the image processing device 1 executes an edge extraction process of extracting edge points from a grayscale image. At step S102, the image processing device 1 executes an improper region judging process on the basis of processing results of the edge extraction process.

At step S103, the image processing device 1 executes a partition line detection process of detecting partition line candidates on the basis of the edge points extracted at step S101.

At step S104, the image processing device 1 executes an exception judging process of judging presence/absence of a parking prohibition region or the like on the basis of the processing results of steps S101-S103. At step S105, the image processing device 1 executes a parking frame detection process of detecting a parking frame PS.

At step S106, the image processing device 1 performs parking frame management of managing the parking frame PS detected at step S105. At step S107, the image processing device 1 executes a stop position determining process of determining a stop position, where to stop the vehicle C, in the parking frame PS. Then the image processing device 1 finishes the execution of the process shown in FIG. 8.

Figure 9:
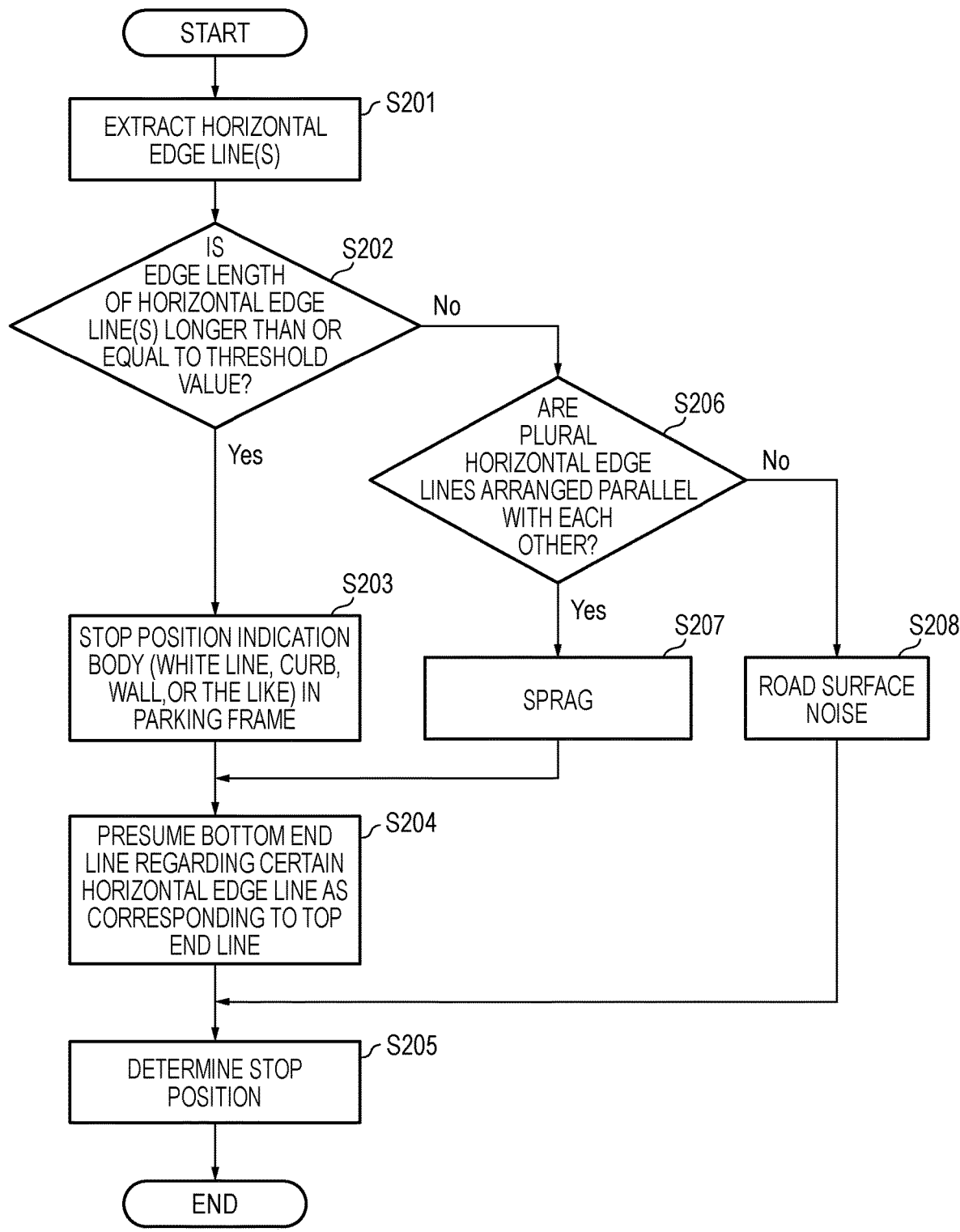
FIG. 9 is a flowchart showing the procedure of a stop position determining process that is executed by the image processing device according to the embodiment.

Next, the procedure of the above-described stop position determining process (step S107) shown in FIG. 8 will be described in detail. FIG. 9 is a flowchart showing the procedure of the stop position determining process which is executed by the image processing device 1.

As shown in FIG. 9, at step S201, the stop position determining unit 27 extracts a horizontal edge line HL in which edge points are arranged consecutively in the horizontal direction from edge points extracted by the edge extraction process (S101).

At step S202, the stop position determining unit 27 judges whether the edge length of the extracted horizontal edge line HL is longer than or equal to a prescribed threshold value (e.g., 150 cm). If the edge length is longer than or equal to the prescribed threshold value (S202: yes), at step S203 the stop position determining unit 27 detects an object in the image I containing the horizontal edge line HL as corresponding to a stop position indication body in the parking frame PS, that is a three-dimensional indication body that defines a deep-side boundary of the parking frame PS.

At step S204, if plural horizontal edge lines HL are arranged in the vertical direction in the detected object corresponding to three-dimensional indication body, the stop position determining unit 27 presumes a bottom end line regarding a certain horizontal edge line HL other than the highest horizontal edge line HL as corresponding to a top end line. At step S205, the stop position determining unit 27 determines a stop position on the basis of the presumed bottom end line. Then the execution of the process is finished.

On the other hand, if the edge length of the horizontal edge line HL is smaller than the prescribed threshold value (S202: no), at step S206 the stop position determining unit 27 judges whether plural horizontal edge lines HL are arranged parallel with each other.

If plural horizontal edge lines HL are arranged parallel with each other (S206: yes), the stop position determining unit 27 detects the object in the image I containing the plural horizontal edge lines HL as corresponding to a sprag LP at step S207 and then executes step S204.

On the other hand, if no plural horizontal edge lines HL are arranged parallel with each other (S206: no), the stop position determining unit 27 detects the horizontal edge line HL as road surface noise at step S208 and then executes step S205.

As described above, the stop position determining unit 27 of the image processing device 1 according to the embodiment is equipped with the extraction unit 271, the detection unit 272, and the determining unit 273. The extraction unit 271 extracts a horizontal edge line HL in which edge points are arranged consecutively in the horizontal direction from an image I taken that contains an image of a parking frame PS. The detection unit 272 detects a three-dimensional indication body to serve as a stop position indication body in the parking frame PS on the basis of the horizontal edge line HL extracted by the extraction unit 271. If plural horizontal edge lines HL are arranged in the vertical direction in an image of the three-dimensional indication body, the determining unit 273 determines a stop position regarding a certain horizontal edge line HL other than a highest horizontal edge line HL in the vertical direction as corresponding to a top end line of the three-dimensional indication body. The image processing device 1 thus configured can determine a stop position with high accuracy.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: Image processing device
2: Control unit
3: Storage unit
10: Vehicular camera
21: Line segment extraction unit
22: Improper region judging unit
23: Partition line detection unit
24: Exception judging unit
25: Parking frame detection unit
26: Parking frame managing unit
27: Stop position determining unit
31: Indication body identification information
50: Host ECU
100: Parking assist system
200: Obstructive object
271: Extraction unit
272: Detection unit
273: Determining unit
C: Vehicle
HL: Horizontal edge line
I: Image taken
LP: Sprag

What is claimed is:

1. An image processing device comprising:
a computer including a hardware processor configured to function as an extraction unit, a detection unit and a determining unit, wherein
the extraction unit extracts a horizontal edge line in which edge points are arranged consecutively in a horizontal direction from a taken image that contains an image of a parking frame, the taken image that contains the image of the parking frame from which the horizontal edge line is extracted being taken by a vehicular camera mounted on a vehicle and viewing the parking frame from an obliquely-downward direction;
the detection unit detects a three-dimensional indication body that serves as a stop position indication body in the parking frame based on the horizontal edge line extracted by the extraction unit; and
the determining unit, in a case where a plurality of the horizontal edge lines are arranged in a vertical direction relative to each other and a road surface in an image of the three-dimensional indication body detected by the detection unit in the taken image that views the parking frame from the obliquely-downward direction, determines the stop position by using one of the plurality of the horizontal edge lines other than a highest one of the plurality of horizontal edge lines in the vertical direction as corresponding to a top end line of the three-dimensional indication body.

2. The image processing device according to claim 1, wherein the determining unit determines the stop position by using a lowest horizontal edge line in the vertical direction as corresponding to the top end line in the case where the plurality of the horizontal edge lines are arranged in the vertical direction.

3. The image processing device according to claim 1, wherein the detection unit detects a type of the three-dimensional indication body based on an edge length of the horizontal edge line.

4. The image processing device according to claim 2, wherein the detection unit detects a type of the three-dimensional indication body based on an edge length of the horizontal edge line.

5. The image processing device according to claim 1, wherein the detection unit detects a type of the three-dimensional indication body based on a number of the horizontal edge lines contained in the image of the three-dimensional indication body.

6. The image processing device according to claim 2, wherein the detection unit detects a type of the three-dimensional indication body based on a number of the horizontal edge lines contained in the image of the three-dimensional indication body.

7. The image processing device according to claim 3, wherein the detection unit detects a type of the three-dimensional indication body based on a number of the horizontal edge lines contained in the image of the three-dimensional indication body.

8. The image processing device according to claim 4, wherein the detection unit detects a type of the three-dimensional indication body based on a number of the horizontal edge lines contained in the image of the three-dimensional indication body.

9. An image processing method comprising:

extracting, by a computer having a hardware processor, a horizontal edge line in which edge points are arranged consecutively in a horizontal direction from a taken image that contains an image of a parking frame, the taken image that contains the image of the parking frame from which the horizontal edge line is extracted being taken by a vehicular camera mounted on a vehicle and viewing the parking frame from an obliquely-downward direction;

detecting, by the computer having the hardware processor, a three-dimensional indication body that serves as a stop position indication body in the parking frame based on the extracted horizontal edge line; and determining, by the computer having the hardware processor, in a case where a plurality of the horizontal edge lines are arranged in a vertical direction relative to each other and a road surface in an image of the detected three-dimensional indication body in the taken image that views the parking frame from the obliquely-downward direction, the stop position by using one of the plurality of the horizontal edge lines other than a highest one of the plurality of horizontal edge lines in the vertical direction as corresponding to a top end line of the three-dimensional indication body.

* * * * *